(12) United States Patent
Kindaichi

(10) Patent No.: US 6,172,375 B1
(45) Date of Patent: Jan. 9, 2001

(54) DISTANCE MEASUREMENT APPARATUS HAVING DUAL DISTANCE MEASURING MEANS

(75) Inventor: Takeshi Kindaichi, Hachioji (JP)

(73) Assignee: Olympus Optical Co., Ltd., Tokyo (JP)

( * ) Notice: Under 35 U.S.C. 154(b), the term of this patent shall be extended for 0 days.

(21) Appl. No.: 09/172,531

(22) Filed: Oct. 14, 1998

(30) Foreign Application Priority Data

Oct. 17, 1997  (JP) ................................................. 9-285289

(51) Int. Cl.[7] .................................................. G01N 21/86
(52) U.S. Cl. ................................ 250/559.38; 250/201.5; 396/121
(58) Field of Search ........................... 250/208.1, 559.38, 250/201.5, 201.2; 356/4.07, 375; 396/121, 106, 80

(56) References Cited

U.S. PATENT DOCUMENTS

| 4,853,731 | 8/1989 | Tsujimura et al. ..................... 396/90 |
| 5,939,705 | * 8/1999 | Nakamura ......................... 250/201.7 |

FOREIGN PATENT DOCUMENTS 64-78205  3/1989  (JP).
64-78206  3/1989  (JP).
64-84231  3/1989  (JP).

\* cited by examiner

*Primary Examiner*—Que T. Le
(74) *Attorney, Agent, or Firm*—Frishauf, Holtz, Goodman, Langer & Chick, P.C.

(57) ABSTRACT

This invention allows photography even when distance measurement is impossible, reduces the number of out-of-focus photographs, and reduces the cost of an apparatus. In this distance measurement apparatus, an object is illuminated with an auxiliary light-emitting unit, and light reflected by the object and transmitted through a pair of optical units spaced apart at a predetermined interval is received by a light-receiving unit. The light-receiving unit outputs two image signals to an arithmetic unit. In the first distance measurement mode, the arithmetic unit and a control unit calculate object distance on the basis of the relative image distance between the two image signals. Also, in the second distance measurement mode, the arithmetic unit and the control unit calculate object distance on the basis of the difference between the light amounts from the object in the illuminated and non-illuminated states with the auxiliary light-emitting unit.

17 Claims, 5 Drawing Sheets

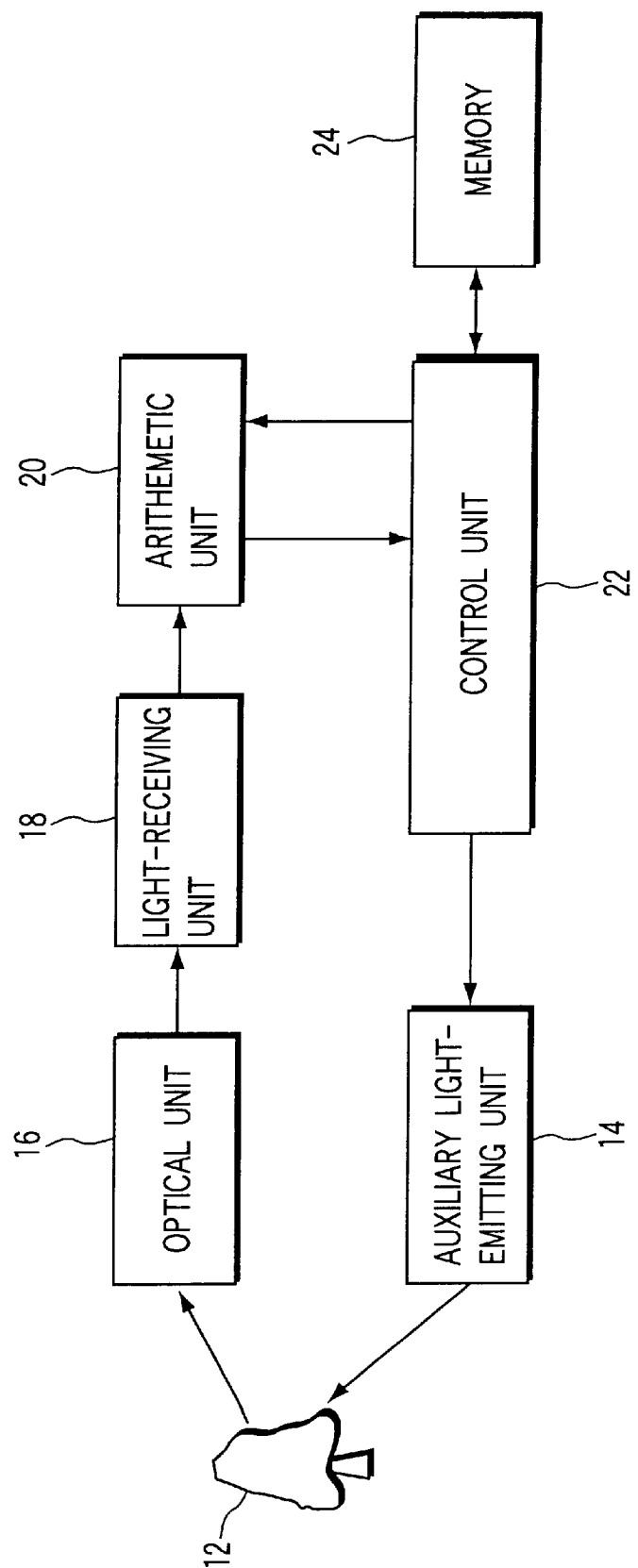
F I G. 1

DISTANCE MEASUREMENT APPARATUS HAVING DUAL DISTANCE MEASURING MEANS

BACKGROUND OF THE INVENTION

The present invention relates to a distance measurement apparatus for automatically performing focus control of a camera in accordance with the distance to an object to be photographed. More particularly, the present invention relates to a method that can cope when distance measurement is impossible in a distance measurement apparatus for detecting object distance by obtaining the relative image distance between the first and second object images formed by a pair of lenses spaced apart at a predetermined interval.

In a conventional camera using a passive AF (Auto Focus) function, when distance measurement is impossible, the shutter is locked (kept inoperative) or the focusing lens is extended to a predetermined position regardless of the object distance, and then the shutter is operated (actuated).

As disclosed in Jpn. Pat. Appln. KOKAI Publication No. 64-84231, there is also known a method of extending the focusing lens to infinity for a bright object not requiring use of an electronic flash, and to the position to which light from the electronic flash can reach for a dark object requiring use of the electronic flash.

Jpn. Pat. Appln. KOKAI Publication Nos. 64-78205 and 64-78206 disclose techniques for measuring the distance to a low-luminance, low-contrast object by phase difference detection using CCD output data of only auxiliary light.

The conventional techniques except lock processing in all the prior arts described above extend the focusing lens regardless of the object distance and photograph, thereby resulting in a large number of out-of-focus photographs. These prior arts were primarily devised to eliminate the confusion and dissatisfaction experienced when the user cannot take photographs. A large number of out-of-focus photographs, however, do not mean that this objective has satisfactorily been achieved. How to reduce this large number of out-of-focus photographs is still left unsolved.

The techniques disclosed in Jpn. Pat. Appln. KOKAI Publication Nos. 64-78205 and 64-78206 take a long time to acquire (integrate) data enough to operate correlation for CCD sensor elements in the ON state of auxiliary light. In addition, the complexity of distance measurement operation requires a high-speed arithmetic means (CPU), resulting in a high-cost apparatus.

BRIEF SUMMARY OF THE INVENTION

It is, therefore, an object of the present invention to provide a distance measurement apparatus capable of photography even when distance measurement cannot be done, reducing the number of out-of-focus photographs, and preventing an increase in apparatus cost.

It is the first object of the present invention is to provide a distance measurement apparatus comprising:

auxiliary light means for illuminating an object to be photographed;

a pair of optical means placed at a predetermined interval;

light-receiving means for receiving light from the object through the optical means and outputting two image signals;

first distance measurement means for calculating an object distance on the basis of a relative image distance between the two image signals; and second distance measurement means for calculating the object distance on the basis of a difference between light amounts from the object in illuminated and non-illuminated states with the auxiliary light means.

It is the second object of the present invention to provide a distance measurement apparatus comprising:

an auxiliary light unit for illuminating an object to be photographed;

a pair of optical units placed at a predetermined interval;

a light-receiving unit for receiving light from the object through the optical units and outputting two image signals;

a first distance measurement unit for calculating an object distance on the basis of a relative image distance between the two image signals;

a second distance measurement unit for calculating the object distance on the basis of a difference between light amounts from the object in illuminated and non-illuminated states with the auxiliary light unit; and a control unit for determining reliability of the object distance calculated by the first distance measurement unit, and operating the second distance measurement unit upon determining that the object distance calculated by the first distance measurement unit is not reliable.

It is the third object of the present invention to provide a distance measurement apparatus comprising:

auxiliary light means for illuminating an object to be photographed;

a pair of optical means placed at a predetermined interval;

light-receiving means for receiving light from the object through the optical means and outputting two image signals;

first distance measurement mode arithmetic means for calculating a first distance measurement mode, the first distance measurement mode arithmetic means including first arithmetic means for obtaining a relative image distance of the two image signals on the basis of outputs from the optical means and second arithmetic means for calculating the object distance on the basis of the relative image distance;

second distance measurement mode arithmetic means for calculating a second distance measurement mode, the second distance measurement mode arithmetic means including third arithmetic means for obtaining a light amount from the object, when only the auxiliary light means is used as an illumination light source for the object, in accordance with a difference of light amounts from the object in illuminated and non-illuminated states with the auxiliary light means, and fourth arithmetic means for obtaining the object distance on the basis of the light amount obtained by the third arithmetic means; and control means for performing distance measurement in the first distance measurement mode, and performing distance measurement in the second distance measurement mode when the first distance measurement mode is incapable of distance measurement.

It is the fourth object of the present invention to provide a distance measurement apparatus comprising:

first distance measurement means for obtaining an object distance by a phase difference detection method;

second distance measurement means for obtaining an object distance upon detection of an auxiliary light amount; and control means for actuating the second distance measurement means when the first distance measurement means is incapable of distance measurement.

It is the fifth object of the present invention to provide a distance measurement apparatus comprising:

auxiliary light means for illuminating an object to be photographed;

a pair of optical means placed at a predetermined interval;

light-receiving means for receiving light from the object through the optical means and outputting two image signals;

first distance measurement means for calculating an object distance on the basis of a relative image distance between the two image signals;

second distance measurement means for calculating the object distance on the basis of a reflected light amount from the object upon illumination by the auxiliary light means; and control means for determining reliability of the object distance calculated by the first distance measurement means, and operating the second distance measurement means upon determining that the object distance calculated by the first distance measurement means is not reliable.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 1 is a block diagram showing the concept of a distance measurement apparatus of the present invention;

DETAILED DESCRIPTION OF THE INVENTION

Figure 2:
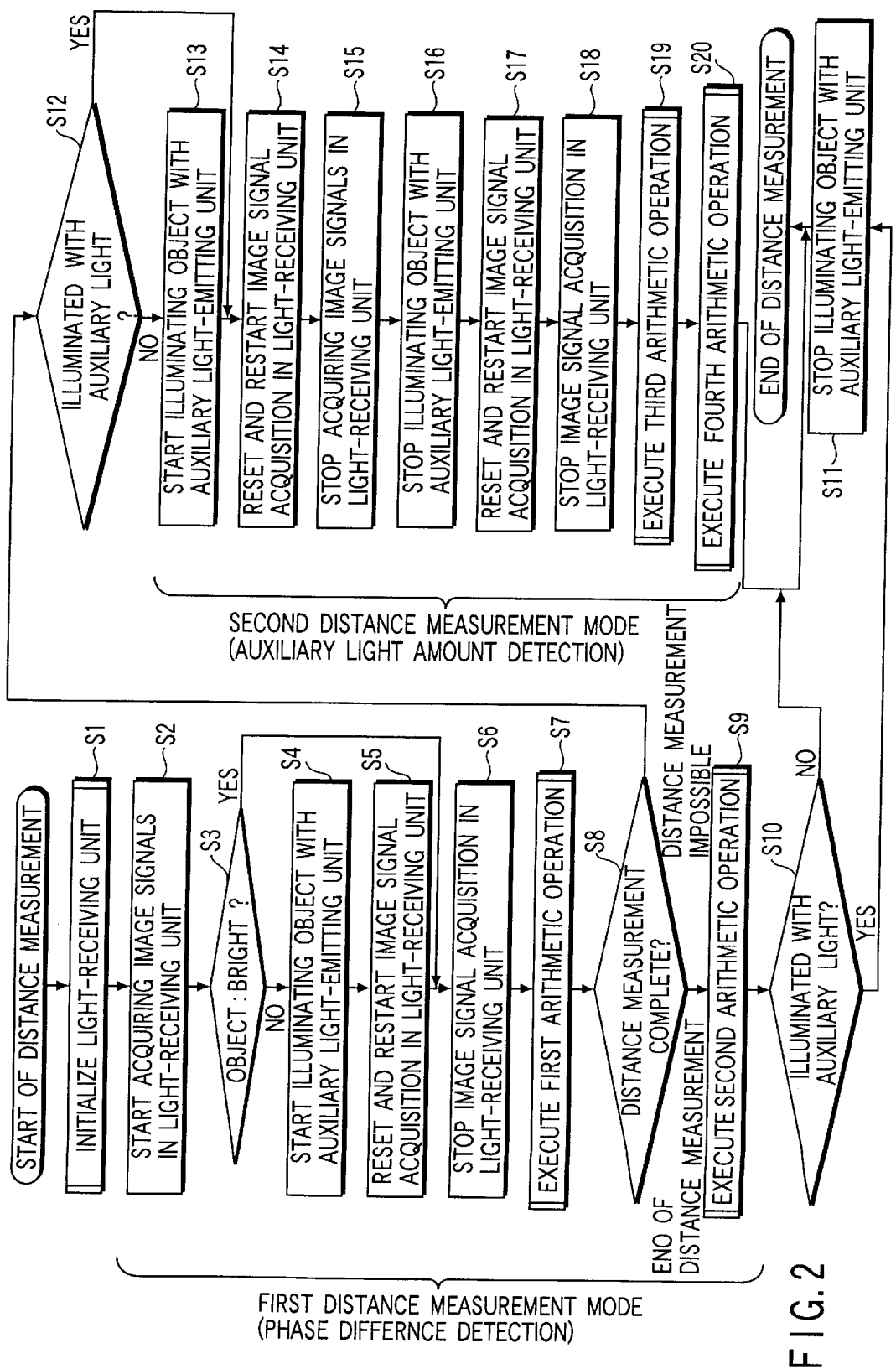
FIG. 2 is a flow chart for explaining the operation of a camera to which the distance measurement apparatus is applied according to the first embodiment of the present invention.

The preferred embodiments of the present invention will be described in detail with reference to the accompanying drawing.

FIG. 1 is a block diagram showing the concept of a distance measurement apparatus according to the present invention.

Referring to FIG. 1, this distance measurement apparatus comprises an auxiliary light-emitting unit 14 for emitting auxiliary light to an object 12, an optical unit 16 composed of a pair of lenses having a predetermined interval therebetween, a light-receiving unit 18, an arithmetic unit 20, a control unit 22, and a memory 24.

The auxiliary light-emitting unit 14 includes an LED, a lamp, and an electronic flash. The light-receiving unit 18 comprises a plurality of photoelectric conversion elements. The light-receiving unit 18 receives an object image focused by each lens of the optical unit 16 and outputs an electrical signal corresponding to the light amount of the object image. The arithmetic unit 20 has at least a function of calculating object distance on the basis of the relative image distance between two image signals obtained from the light-receiving unit 18, a function of calculating an object luminance on the basis of the light-receiving unit 18 outputs in the illuminated and non-illuminated states of auxiliary light from the auxiliary light-emitting unit 14, and a function of calculating the object distance from the resultant object luminance.

The control unit 22 controls the operations of at least the auxiliary light-emitting unit 14, the arithmetic unit 20, and the memory 24. The control unit 22 includes an object luminance determination means for determining on the basis of the calculated object luminance whether the auxiliary light-emitting unit 14 is to be operated. The control unit 22 may also control predetermined camera operations except the distance measurement operation. The memory 24 stores image signals obtained from the light-receiving unit 18. Although the optical unit 16 and the light-receiving unit 18 are illustrated as separate blocks in FIG. 1, an AF module (not shown) may be integrated with the optical unit 16 and the light-receiving unit 18.

The arithmetic unit 20 and the control unit 22 can be implemented by one CPU.

The operation of a camera to which the distance measurement apparatus according to the first embodiment of the present invention is applied will be described with reference to the flow chart in FIG. 2.

When the user presses the release button of the camera, the distance measurement operation is started. The optical unit 16 is initialized in step S1. This initialization includes power supply to the optical unit 16 and setting of sensor sensitivity, and the like.

The control unit 22 determines in steps S2 to S5 whether object illumination by the auxiliary light-emitting unit 14 is required. The object is illuminated with the auxiliary light-emitting unit 14, as needed.

More specifically, when image signal acquisition is started in the light-receiving unit 18 in step S2, the luminance of the object 12 is determined in step S3. If it is determined in step S3 that the object is bright, the flow advances to step S6; otherwise, the flow advances to step S4.

In step S4, the object 12 is illuminated with auxiliary light from the auxiliary light-emitting unit 14. In step S5, reset and restart for acquiring image signals in the illuminated state with the auxiliary light are performed in the light-receiving unit 18 through the optical unit 16.

In this embodiment, whether object illumination is required is determined using the output from the distance measurement light-receiving unit 18. However, this determination can be made using an output from the photometric means (not shown) for exposure of the camera.

In step S6, the image signals from the light-receiving unit 18 are completely acquired, so that the first and second image signals of the object 12 are obtained. The image signals quantized by the light-receiving unit 18 are stored in the memory 24.

In step S7, the first arithmetic operation is performed. The first arithmetic operation calculates the relative image distance (or phase difference) between the first and second image signals of the object 12. This arithmetic operation is a known technique generally called a correlation means.

In step S8, information such as low contrast of the object 12 or a low degree of coincidence between the first and second image signals is detected from the first and second image signals of the object 12. The arithmetic operation result of the first arithmetic operation is evaluated. If it is determined by this evaluation result that the arithmetic operation result of the first arithmetic operation is not reliable, distance measurement is determined impossible.

In multi AF or the like having a plurality of distance measurement points, distance measurement is determined impossible when all the arithmetic operation results of all the distance measurement points are unreliable. Whether distance measurement is possible is determined by the control unit 22. The control unit 22 outputs a signal indicating whether distance measurement was successfully done.

When it is determined in step S8 that the arithmetic operation results of the first arithmetic operation are highly reliable and the distance measurement has been normally performed, the flow advances to step S9. In step S9, the relative image distance between the first and second image signals of the object 12 is converted into object distance information by the second arithmetic operation.

It is determined in step S10 whether auxiliary light is present/absent. When the object 12 is illuminated with the auxiliary light-emitting unit 14, the flow advances to step S11 to end illumination and complete distance measurement. The execution timings of steps S10 and S11 are not specifically limited as far as these steps are performed after step S6.

When it is determined in step S8 that distance measurement is impossible in the first distance measurement mode, the flow advances to step S12 to determine whether auxiliary light is present/absent. If the object is not illuminated with the auxiliary light-emitting unit 14, the flow advances to step S13 to start illuminating the object. When the auxiliary light-emitting unit 14 is built by a lamp or the like which requires a long time to stabilize the emission amount upon the start of emission, an emission stabilization time is required.

In steps S14 and S15, the first and second image signals of the object 12 during illumination with the auxiliary light-emitting unit 14 are acquired. In steps S16 to S18, the first and second image signals of the object 12 after the illumination with the auxiliary light-emitting unit 14 is complete and illumination is not done are acquired.

The third arithmetic operation is performed in step S19. That is, the auxiliary light amount is calculated in accordance with the difference between the light amounts from the object 12 in the illuminated and non-illuminated states of the object 12 with the auxiliary light-emitting unit 14. The fourth arithmetic operation is then performed in step S20 to convert the auxiliary light amount into the distance information of the object 12, thereby completing the distance measurement.

As described above, according to the outline of the first embodiment, a distance measurement is performed in the first distance measurement mode. If this distance measurement is determined as normal, the distance measurement is complete. The distance measurement result in the first distance measurement mode is defined as object distance information. However, if the measurement result in the first distance measurement mode is determined as abnormal, another distance measurement is performed in the second distance measurement mode. The distance measurement result in the second distance measurement mode is defined as object distance information.

Figure 3:
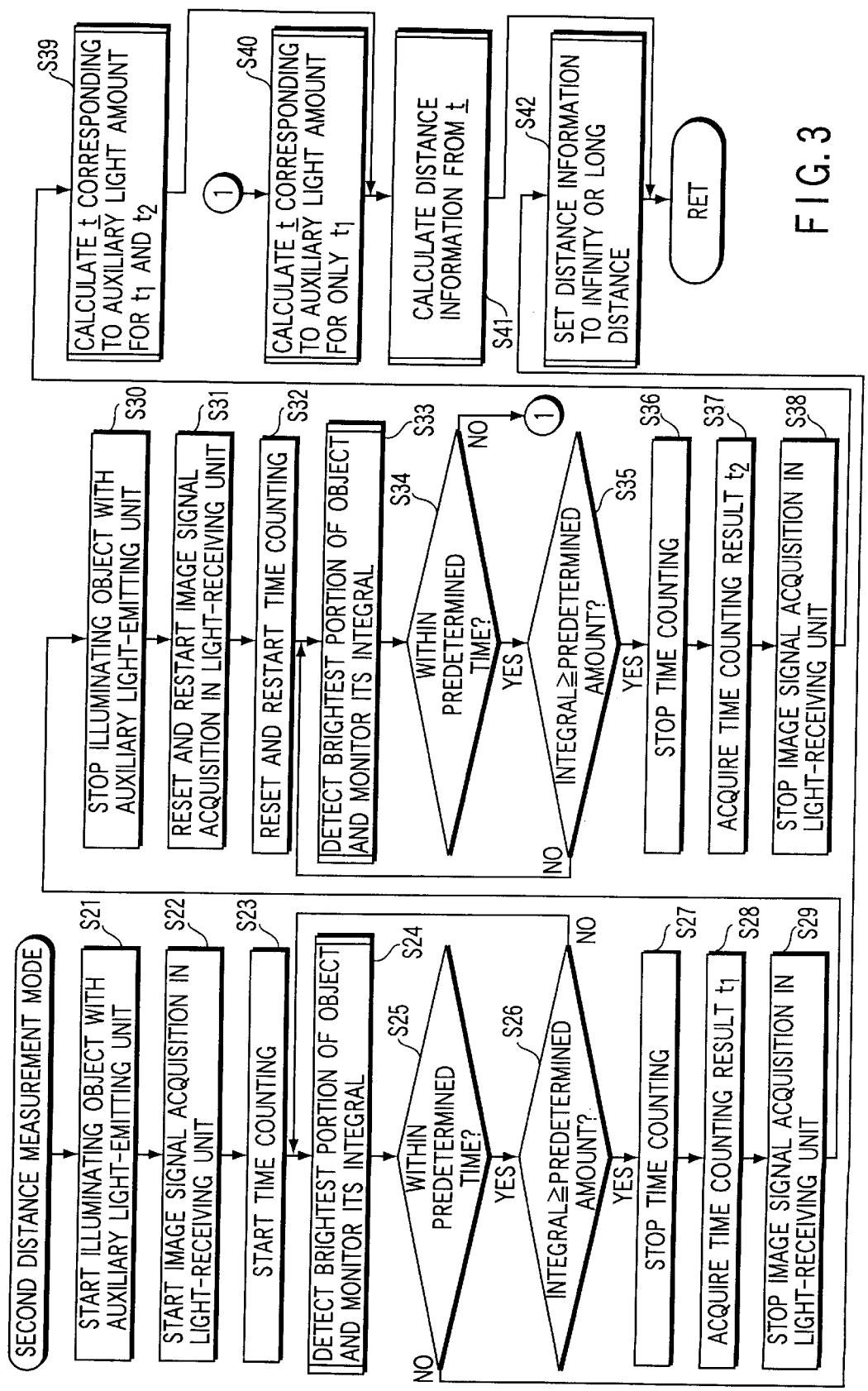
FIG. 3 is a flow chart for explaining the operation of the second distance measurement mode in detail.

The operation in the second distance measurement mode will be described in detail with reference to the flow chart in FIG. 3.

In step S21, the auxiliary light-emitting unit 14 starts illuminating the object. Image signal acquisition (to be referred to as integration hereinafter) in the light-receiving unit 18 is started in step S22. Note that an auxiliary light emission stabilization time may be required between steps S21 and S22.

Time counting is started in step S23. When this integration is started, the brightest portion of the object 12 is detected in step S24, and an integral corresponding to the brightest portion is monitored. Step S25 is a limiter for the integration time. When the integration time is long, the flow advances to step S42 to execute infinity processing.

When the integration is completed within a predetermined time in step S25, the flow advances to step S26 to determine whether the integral has reached a predetermined amount. If NO in step S26, the flow returns to step S24; otherwise, the flow advances to steps S27 to S29 to complete time counting, acquire a time counting result $t_1$, and complete integration in the order named.

The auxiliary light-emitting unit 14 stops illuminating the object in step S30. A time $t_2$ required until the integral of the brightest portion of the object 12 reaches the predetermined amount is measured in steps S31 to S38. More specifically, the integration is started in the light-receiving unit 18 in step S31, and time counting is started again in step S32. The brightest portion of the object is detected in step S33, and an integral corresponding to the brightest portion is monitored. Step S34 is a limiter for the integration time. When the integration time is long, the flow advances to step S40 to perform dark state processing.

When the integration is completed within the predetermined time in step S34, the flow advances to step S35 to determine whether the integral has reached the predetermined amount. If NO in step S35, the flow returns to step S33; otherwise, time counting is completed, a time counting result $t_2$ is acquired, and integration is completed in steps S36 to S38 in the order named.

Note that an auxiliary light complete turn-off time may be required between steps S30 and S31.

The integration time $t_1$ upon illumination of the object and the integration time $t_2$ without illumination of the object are obtained in steps S21 to S38.

In step S39, an integration time t corresponding to the auxiliary light amount is obtained.

Figure 4:
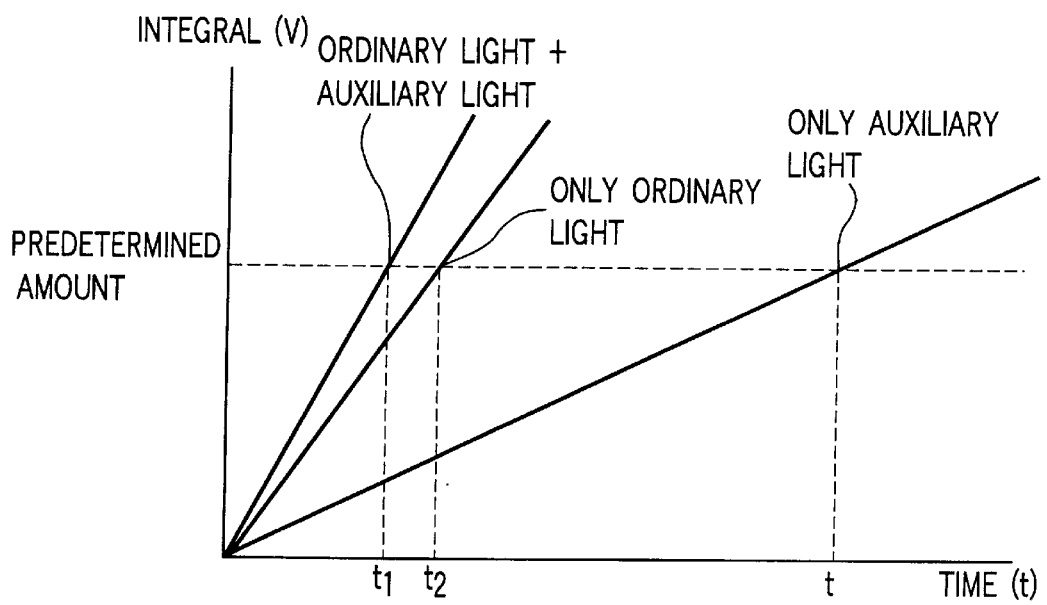
FIG. 4 is a graph of the integrated characteristics of the photocurrent from the brightest portion of an object, and shows the relationship between integration times $t_1$ and $t_2$.

FIG. 4 is a graph of integration characteristics of the photocurrent from the brightest portion of the object 12, and shows the relationship between the integration times $t_1$ and $t_2$.

When a line "only ordinary light" is subtracted from a line "ordinary light +auxiliary light" in FIG. 4, a line "only auxiliary light" is obtained. In this relationship, the integration time t is given by:

$$t=t_1 \times t_2/(t_2-t_1) \tag{1}$$

The denominator in equation (1) may become zero or less due to a cause such as a high luminance, a measurement error, infinity, or a long distance. In this case, the denominator is determined to be zero, and the object distance is determined as infinity or a long distance. When the auxiliary light amount is obtained, the object distance can be obtained because the auxiliary light amount is in inverse proportion to the square of the object distance.

The dark state processing is performed in step S40. This dark state processing is executed when integration progresses little under the condition that the auxiliary light-emitting unit 14 does not illuminate the object 12, i.e., the object 12 is in the dark. The dark state processing is performed for $t_2=0$ and $t=t_1$.

The object distance is obtained in step S41. If an auxiliary light amount a at 1 m is stored in the memory 24 as an adjustment value, the object distance can be obtained using this adjustment value as a reference using equation (2) below. More specifically, the amount a is the auxiliary light amount measured when a standard reflecting plate (gray: reflectance of 18%) is placed 1 m apart from the auxiliary light-emitting unit 14. The light amount distance measurement is performed using this as the reference.

The difference between the actual reflectance of the object 12 and the reflectance of the standard reflecting plate results in a distance measurement error. However, design is done to minimize any distance measurement error in the actual reflectance distribution of the object 12 by selecting the standard reflecting plate serving as a reference for determining the camera exposure and a lamp having relatively flat spectral emission characteristics for an adjustment chart and the auxiliary light-emitting unit 14, respectively.

$$L = \sqrt{\frac{t}{a}} \quad (a = Const) \quad (2)$$

The infinity processing in step S42 is executed when integration progresses little even by illumination of the object 12 with the auxiliary light-emitting unit 14, i.e., when the object 12 is at infinity in the dark. No arithmetic operation is performed, and the object distance is infinity or a long distance.

As described above, according to the first embodiment, the object distance can be measured even if distance measurement by the phase difference scheme is impossible.

The second embodiment of the present invention will be described below.

Figure 5:
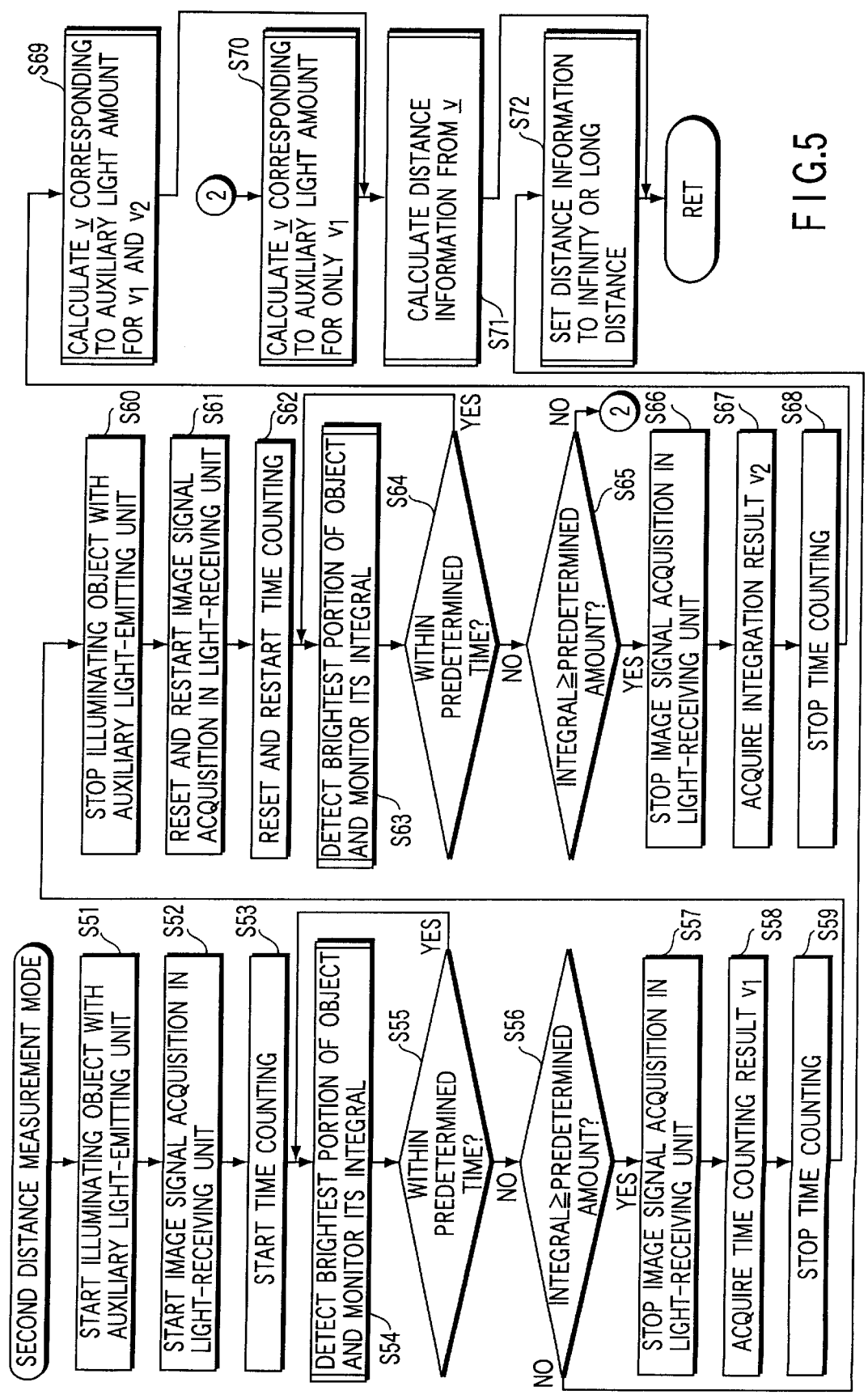
FIG. 5 is a flow chart for explaining the operation of the second distance measurement mode according to the second embodiment of the present invention.

FIG. 5 is a flow chart for explaining the operation in the second distance mode according to the second embodiment of the present invention. The remaining parts of the second embodiment are substantially the same as those of the first embodiment, and its detailed description will be omitted.

In steps S51 to S59, integration is performed while an auxiliary light-emitting unit 14 illuminates an object. Note that steps S51 to S54 are the same as steps S21 to S24 in the flow chart of FIG. 3, and its detailed description will be omitted.

Step S55 is a limiter for the integration time. When the integration time has not yet reached a predetermined time, the flow returns to step S54; otherwise the flow advances to step S56 to determine whether the integral has reached a predetermined amount.

If NO in step S56, i.e., if an integral $v_1$ is the predetermined amount or less, the object is determined to be located at infinity in the dark. The flow then advances to step S72. If YES in step S56, the flow advances to steps S57 to S59 to complete integration, acquire the integral $v_1$, and complete time counting in the order named. In this manner, the integral $v_1$ for the brightest portion of the object 12 a predetermined time after the start of integration is measured.

Integration for the object 12 in the non-illustrated state is performed in steps S60 to S68. Note that steps S60 to S63 are the same as steps S30 to S33 in the flow chart of FIG. 3, and its detailed description will be omitted.

Step S64 is a limiter for the integration time. When the integration time has not reached a predetermined time, the flow returns to step S63; otherwise, the flow advances to step S65 to determine whether the integral reaches the predetermined amount.

When it is determined in step S65 that the integral has not reached the predetermined amount, i.e., when an integral $v_2$ is the predetermined amount or less, the object is determined to be in the dark, and the flow advances to step S70. If it is determined in step S65 that the integral has reached the predetermined amount, the flow advances to steps S66 to S68 to complete integration, acquire the integral $v_2$, and complete time counting in the order named. The integral $v_2$ of the brightest portion of the object a predetermined time after the start of integration is measured.

In step S69, an integral v corresponding to the auxiliary light amount is obtained from the integrals $v_1$ and $v_2$ by equation (3) below. Note that the method of determining an adjustment value b is the same as that of determining the adjustment value a described above.

$$v = v_1 - v_2 \quad (3)$$

Dark state processing is performed in step S70. This dark state processing is performed for the integration values $v_2=0$ and $v=v_1$. An object distance L is given using the integration value v by:

$$L = \sqrt{\frac{b}{v}} \quad (b = Const) \quad (4)$$

Infinity processing is performed in step S72. This infinity processing is executed to determine infinity or long distance as the object distance L without performing any arithmetic operation.

Figure 6:
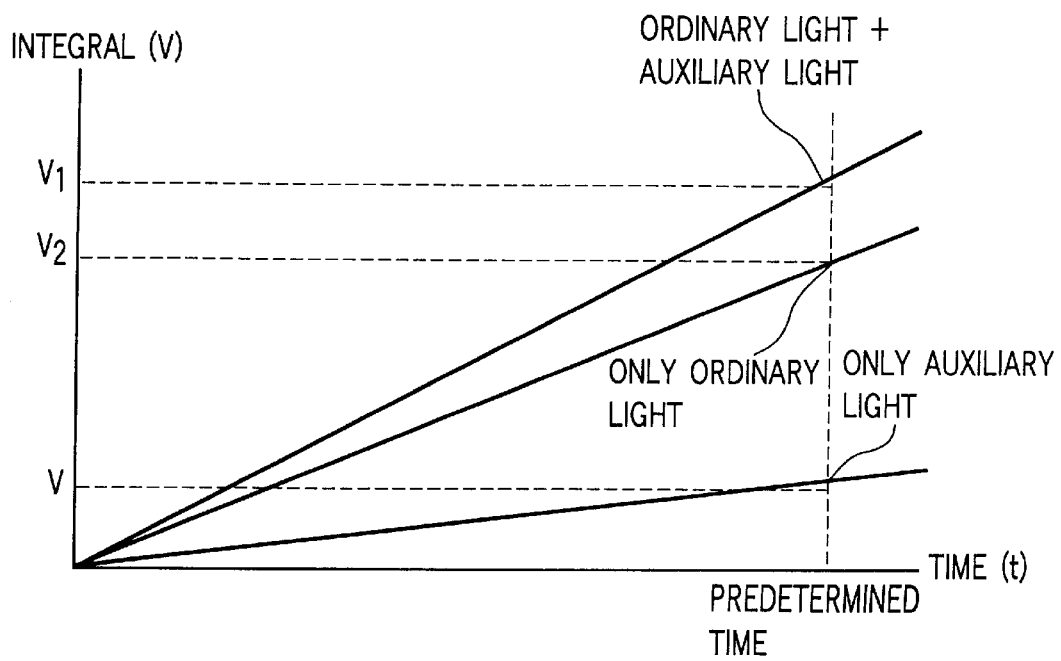
FIG. 6 is a graph of the integrated characteristics of the photocurrent from the brightest portion of an object, and shows the relationship between integrals $v_1$ and $v_2$.

FIG. 6 is a graph of integration characteristics of the photocurrent from the brightest portion of the object, and shows the relationship between the integration values $v_1$, $v_2$, and v.

As is apparent from FIG. 6, when a line "only ordinary light" is subtracted from a line "ordinary light+auxiliary light", a line "only auxiliary light" is obtained.

As described above, according to the second embodiment, the object distance can be measured even if distance measurement by the phase difference scheme is impossible.

In each embodiment described above, an auxiliary light amount is calculated using first and second image signals in the second distance measurement mode. However, the auxiliary light amount may be obtained using one of the first and second image signals.

As has been described above, according to the present invention, there can be provided a simple, low-cost distance measurement apparatus capable of accurate focusing even if distance measurement by the phase difference scheme cannot be made for an object such as an unintended object.

According to the present invention, since it suffices to monitor the integration value of the brightest portion of an object, the arithmetic operation time can be shortened.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A distance measurement apparatus comprising:
auxiliary light means for illuminating an object to be photographed;
a pair of optical means placed at a predetermined interval;
light-receiving means for receiving light from the object through said optical means and outputting two image signals;
first distance measurement means for calculating an object distance on the basis of a relative image distance between the two image signals; and
second distance measurement means for calculating the object distance on the basis of a difference between light amounts from the object in illuminated and non-illuminated states with said auxiliary light means.

2. A distance measurement apparatus comprising:
an auxiliary light unit for illuminating an object to be photographed;
a pair of optical units placed at a predetermined interval;
a light-receiving unit for receiving light from the object through said optical units and outputting two image signals;
a first distance measurement unit for calculating an object distance on the basis of a relative image distance between the two image signals;
a second distance measurement unit for calculating the object distance on the basis of a difference between light amounts from the object in illuminated and non-illuminated states with said auxiliary light unit; and
a control unit for determining reliability of the object distance calculated by said first distance measurement unit, and operating said second distance measurement unit upon determining that the object distance calculated by said first distance measurement unit is not reliable.

3. An apparatus according to claim 2, wherein each of said optical units comprises an image sensing device constructed by a plurality of photoelectric conversion elements, and said second distance measurement unit calculates the object distance on the basis of a time difference between the illuminated and non-illuminated states with the auxiliary light until an integral of each of said image sensing devices reaches a predetermined amount.

4. An apparatus according to claim 3, wherein when the integral of said each image sensing device does not reach the predetermined amount within a predetermined time in illumination with the auxiliary light, the object is determined to be located at infinity or a long distance.

5. An apparatus according to claim 3, wherein the integral calculated by said second distance measurement unit is an integral of corresponding photoelectric transducer elements corresponding to a brightest portion of the object.

6. An apparatus according to claim 2, wherein said light-receiving unit comprises image sensing devices each constructed by a plurality of photoelectric conversion elements, and said second distance measurement unit calculates an object distance on the basis of an integral difference between said image sensing devices within a predetermined time in the illuminated and non-illuminated states with the auxiliary light.

7. An apparatus according to claim 6, wherein when the integral of said each image sensing device does not reach the predetermined amount within a predetermined time in illumination with the auxiliary light, the object is determined to be located at infinity or a long distance.

8. An apparatus according to claim 6, wherein the integral is an integral of corresponding photoelectric conversion elements corresponding to a brightest portion of the object.

9. A distance measurement apparatus comprising:
auxiliary light means for illuminating an object to be photographed;
a pair of optical means placed at a predetermined interval;
light-receiving means for receiving light from the object through said optical means and outputting two image signals;
first distance measurement mode arithmetic means for calculating a first distance measurement mode, said first distance measurement mode arithmetic means including first arithmetic means for obtaining a relative image distance of the two image signals on the basis of outputs from said optical means and second arithmetic means for calculating the object distance on the basis of the relative image distance;
second distance measurement mode arithmetic means for calculating a second distance measurement mode, said second distance measurement mode arithmetic means including third arithmetic means for obtaining a light amount from the object, when only said auxiliary light means is used as an illumination light source for the object in accordance with a difference of light amounts from the object in illuminated and non-illuminated states with said auxiliary light means, and fourth arithmetic means for obtaining the object distance on the basis of the light amount obtained by said third arithmetic means; and
control means for performing distance measurement in the first distance measurement mode, and performing distance measurement in the second distance measurement mode when the first distance measurement mode is incapable of distance measurement.

10. An apparatus according to claim 9, wherein said light-receiving means comprises image sensing devices each constructed by a plurality of photoelectric transducer elements, and said third arithmetic means calculates a reflected light amount of the auxiliary light on the basis of a time for an integral of a photocurrent from photoelectric conversion elements corresponding to a brightest portion of the object in the illuminated and non-illuminated states of the object to reach a predetermined amount.

11. An apparatus according to claim 9, wherein the second distance measurement mode completes integration in a predetermined time when an integral in the illuminated state of the object with said auxiliary light means does not reach a predetermined amount within the predetermined time, and said third and fourth arithmetic means determine that the object distance is infinity or a long distance.

12. An apparatus according to claim 9, wherein the second distance measurement mode completes integration in a predetermined time when an integral in the non-illuminated state of the object with said auxiliary light means does not reach a predetermined amount within the predetermined time, and said third and fourth arithmetic means determine that the object is in the dark, and calculates a reflected light amount of the auxiliary light by using only the integration time in the illuminated state.

13. An apparatus according to claim 9, wherein said light-receiving means comprises image sensing devices each constructed by a plurality of photoelectric conversion elements, and said third arithmetic means predicts a reflected light amount of the auxiliary light on the basis of an integral of a photocurrent corresponding to a brightest portion of the object in the illuminated and non-illuminated states of the object within a predetermined time.

14. An apparatus according to claim 9, wherein the second distance measurement mode completes integration in a predetermined time when an integral in the illuminated state of the object with said auxiliary light means does not reach a predetermined amount within the predetermined time, and said third and fourth arithmetic means determine that the object distance is infinity or a long distance.

15. An apparatus according to claim 9, wherein the second distance measurement mode completes integration in a predetermined time when an integral in the non-illuminated state of the object with said auxiliary light means does not reach a predetermined amount within the predetermined time, and said third and fourth arithmetic means determine that the object is set in the dark, and calculates a reflected light amount of the auxiliary light by using only the integration time in the illuminated state.

16. An apparatus according to claim 9, wherein the second distance measurement mode executes integration in the illuminated state of the object with said auxiliary light means and then integration in the non-illuminated state of the object therewith.

17. A distance measurement apparatus comprising:

auxiliary light means for illuminating an object to be photographed;

a pair of optical means placed at a predetermined interval;

light-receiving means for receiving light from the object through said optical means and outputting two image signals;

first distance measurement means for calculating an object distance on the basis of a relative image distance between the two image signals;

second distance measurement means for calculating the object distance on the basis of a reflected light amount from the object upon illumination by said auxiliary light means; and control means for determining reliability of the object distance calculated by said first distance measurement means, and operating said second distance measurement means upon determining that the object distance calculated by said first distance measurement means is not reliable.

* * * * *